United States Patent Office 3,146,110
Patented Aug. 25, 1964

3,146,110
CAKE MIX AND ACYL LACTYLIC ACID ADDITIVES EMPLOYED THEREIN
Bruce D. Buddemeyer, Overland Park, Kans., and John Robert Moneymaker, Kansas City, Mo., assignors to The Paniplus Company, Kansas City, Mo., a corporation of Missouri
No Drawing. Original application Dec. 28, 1961, Ser. No. 162,927. Divided and this application Jan. 30, 1963, Ser. No. 271,534
3 Claims. (Cl. 99—94)

The present invention relates to acyl monohydroxy monocarboxylic acids and salts thereof which possess unique properties as emulsifiers and modifiers of protein and starch materials; to methods of making such acids and salts; and to improved baked leavened products and ingredients therefore containing such acids and salts.

This application is a division of our co-pending application Serial No. 162,927, filed December 28, 1961.

It is an object of the present invention to provide new and useful acyl monohydroxy monocarboxylic acids and salts thereof.

Another object of the present invention is to provide methods for making acyl monohydroxy monocarboxylic acids and salts.

Still another object of the present invention is to provide improved baked leavened products and ingredients therefor containing acyl monohydroxy carboxylic acids and salts thereof.

Other objects of the present invention will in part be obvious and will in part appear hereinafter.

The new and useful acyl monohydroxy monocarboxylic acid compositions of the present invention are acyl lactylic acids and salts corresponding to the general formula:

$$RCO(OCHCH_3CO)_nOZ$$

wherein RCO is a member selected from the group consisting of acyl radicals of fatty acids containing 16 to 24 carbon atoms, and mixtures thereof; Z is a cation; and $n$ is a number representing the average number of lactyl groups, i.e., (OCHCH$_3$CO), present per molecule of the composition, the value of $n$ being less than 1 and preferably between about 0.3 and 0.9.

The cation Z in the above formula may be selected from the group consisting of hydrogen, alkali metals, alkaline earth metals, ammonia and aluminum. Among the preferred alkali metal cations may be mentioned sodium and potassium, while preferred alkaline earth metal cations include calcium and magnesium.

Compounds satisfying the above formula are referred to herein as acyl lactylic acid compositions.

Although acyl polylactylic acid compositions containing an average number of lactyl groups per mole of greater than 1 are known, as indicated, for example in U.S. Patent 2,733,252, it should be understood that the materials disclosed herein, both in free acid form and in salt form, are different from the polylactylic acids and salts having an $n$ value greater than 1.

For example, the materials of the present invention containing an average of less than 1 lactyl group per molecule are more functional and provide greater utility than compounds in which the average number of lactyl groups per molecule is greater than 1. This is surprising, inasmuch as the functionality would ordinarily be expected to decrease as the fatty acid content increases.

It has also been discovered that the compounds of the present invention in free acid form and containing an average of less than 1 lactyl group per molecule are much more stable than those materials in free acid form having an average number of lactyl groups per molecule of greater than 1. The greater stability of the free acid forms of the materials taught herein permit their use in products requiring a long shelf life, such as, for example, dry cake mixes.

Lactic acid suitable for preparing the acyl lactylic acid compositions described herein may be and usually is an aqueous solution of lactic acid. Technical grades are available in which the lactic acid concentration varies from about 20 to 80 percent.

The stronger acids are generally prepared by concentration of the aqueous solution under vacuum to avoid decomposition.

In preparing the acyl lactylic acid compositions suitable for use in the present invention, free water may be removed from the lactic acid aqueous solutions by heating the solutions at temperatures below about 98° C., and preferably below 90° C., under vacuum. Care should be taken in heating to insure that the temperature does not get higher than about 100° C., at which temperature lactic acid either is converted to the anhydride, or polymerizes to polylactylic acid. Polymerization or anhydride formation will occur to a limited extent even at temperatures as low as 100° C., but this is not serious. The progress of the polymerization during dehydration of the lactic acid aqueous solutions can be followed by titration of samples withdrawn from the reaction vessels. If the samples are saponified, the amount of free water present may also be calculated.

When a dilute solution of lactic acid is concentrated, two molecules of lactic acid condense to form one molecule of lactyllactic acid and free one molecule of water. When the solution is further concentrated by heating, one molecule of lactyllactic acid loses a molecule of water to form one molecule of lactide. The mechanisms of these reactions are believed to be as follows:

$$2CH_3CHOHCOOH \;\rightleftharpoons\; CH_3CHOHCOOCH(CH_3)COOH + H_2O$$

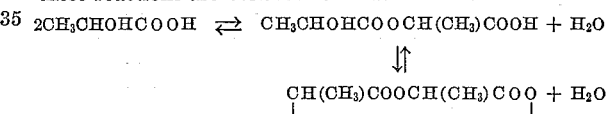

Chain polylactyllactic acids also may be formed through successive loss of water between the carboxyl and alcohol groups. The formula of dilactyllactic acid is:

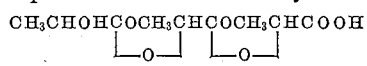

When concentrated acids are subjected to temperatures in excess of 100° to 110° C., the lactic acid is converted gradually to di-, tri-, tetra-, penta-, and other polylactyllactic acids.

As will be seen, aqueous solutions of lactic acid actually contain a mixture of a number of compounds: monomeric lactic acid, lactyl lactic acid, higher polymers of lactic acid, lactide and water.

It is obvious that such a complex mixture cannot be analyzed by merely one criterion, such as free acid titration.

For purposes of producing the acyl lactylic acid products of the present invention, it is desirable to use lactic acid which has been dehydrated in such a manner as to insure minimum polymerization, i.e., minimum formation of polylactyllactic acid and polymeric lactic acid.

This is best done by using low temperatures and an entraining fluid as described in Industrial Engineering and Chemistry, vol. 32, No. 3, pp. 399–401 (1940).

According to the procedure described in the cited article, concentrated lactic acid is produced by distillation of the technical grades of lactic acid containing 20 to 80 percent or more by weight of water in the presence of liquids which form binary mixtures with water, i.e., azeotropic mixtures, which distill at temperatures below the boiling point of the acid, and preferably below about 100° C., or below about 90 to 98° C.

Following this procedure, the water is readily removed and leaves a residue of more or less anhydrous acid with total acidity of 100 percent or more. Care should be employed to insure that the entraining liquid is immiscible with water so that it may be readily separated and recycled.

Suitable for use as the entraining liquid may be mentioned alkyl halides, such as tetrachloroethylene, trichloroethane, carbon tetrachloride, ethylene dichloride, methylene chloride, ethyl chloride, butyl chloride and propylene chloride; aromatic hydrocarbons such as benzene and toluene; and lower boiling hydrocarbons of the alkane, alkene, or alkine series, such as heptane, petroleum ether, and the like. If desired, mixtures of two or more liquids having the properties described may be used as the entraining fluid.

Preferably, the entraining liquid is such that it forms an azeotropic mixture with water that boils below about 100° C., and preferably below about 90° C., or between about 30 and 90° C.

The method of carrying out the concentration procedure will be clear from the following example:

EXAMPLE A

An aqueous solution of lactic acid containing 50 percent by weight of lactic acid as $CH_3CHOHCOOH$ is placed in a still together with an excess of benzene. The mixture is heated to a temperature of 76 to 82° C., at which temperature a binary mixture of water and benzene distills off. The distillate is continuously condensed and the benzene fraction thereof separated from the distillate and continuously recycled to the still. Distillation is continued over the indicated temperature range until no further distillate comes off.

The analysis of the product 4 days after preparation is as follows:

| | Weight percent |
|---|---|
| Total acidity | 101.92 |
| Lactic acid | 66.34 |
| Lactyl-lactic acid | 32.02 |
| Lactide | 0.0 |
| Water | 1.64 |

Following this procedure, concentrated lactic acid having the following compositions may readily be obtained and is preferred for use in practicing the present invention:

| | Weight percent |
|---|---|
| Total acidity | 100 to 108 |
| Lactic acid | 1 to 67 |
| Lactyl-lactic acid | 32 to 95 |
| Lactide | 0 to 6 |
| Water | 0 to 6 |

When dehydration of technical grades of lactic acid are carried out as indicated hereinabove, the concentrated product will have an equivalent weight of between 95 and 130, based on free titratable acidity.

The concentrated lactic acid prepared as indicated hereinabove with distillation temperatures of less than about 100° C. contains substantially no polylactyllactic acid. Thus, the amount of polylactyllactic acid in the concentrate is generally less than 5 percent, and usually less than 3 percent, or between about 0 and 3 percent by weight.

Concentrated lactic acid thus prepared, when reacted with an equimolar quantity of an acyl chloride under specially controlled conditions, as will be made clear hereinbelow, results in a product in which the average number of lactyl groups per molecule is less than 1. In contrast, lactic acid dehydrated at high temperatures produces a product high in polymeric lactic acid which is unsuitable for use in the present invention.

In lieu of using aqueous solutions, lactic acid in dry powdered form, and having an average equivalent weight within the indicated range may also be used. Such dry lactic acid compositions have only recently become commercially available.

To prepare the acyl lactylic acid compositions described herein, lactic acid, suitably prepared as indicated above, is reacted with acyl derivatives of the fatty acids of commerce, such as acyl halides, and more particularly acyl chlorides. The esterification reaction proceeds at room temperature, but for purposes of speed, the reaction mixture may be heated to temperatures of about 50° C. to 95° C., and preferably between about 65° and 75° C. Particularly good results are obtained at 70° C., and this temperature appears to be optitmum. Vacuum removal of gaseous products is not employed until the end of the reaction.

The fatty acid halides employed may be prepared using conventional methods from fatty acids containing 16 to 24 carbon atoms, or from fatty acid mixtures predominantly containing such fatty acids, as for example fatty acid mixtures derived from naturally occurring fats and oils. Preferably, the fatty acids are all reacted with phosphorous trichloride or thionyl chloride to produce the acyl chlorides. By using low temperatures, retaining a maximum of the by-product HCl throughout the reaction, and starting the reaction with a minimum of the fatty acid, anhydride formation is reduced to a minimum.

The manner of forming the acyl monohydroxy monocarboxylic acids disclosed will be clear from the following examples which, although illustrative, are not intended to limit the scope of the invention, except as such limitations may appear in the claims.

EXAMPLE 1

Lactic acid was carefully dehydrated by the benzene entraining method of Example A to an equivalent weight (based on free titratable acidity) of 115. A pure grade of stearyl chloride was made by standard procedures using the special precautions previously mentioned. Equimolar quantities (based on the equivalent weight calculated from the free titratable acidity of the lactic acid) were used. One mole of the stearyl chloride was placed in a reaction flask and heated to 50° C. A mole of the lactic acid was added slowly, with stirring, over a forty-five minute period. During the forty-five minutes, the temperature was gradually raised to 70° C. The mixture was kept at this temperature for ninety minutes. Vacuum was then applied to remove the HCl gas produced, and maintained twenty minutes after the bubbling ceased. The product was washed four times by shaking with a liter of 90° C. distilled water in a separatory funnel, and dried in a vacuum dessicator. The product equivalent weight, based on free titratable acidity, was 340, indicating an average number of lactyl groups per molecule of approximately 0.77. The reaction material was a honey-colored plastic solid with a distinct lipoidal character and had melting range of 51–53° C.

EXAMPLE 2

Lactic acid was carefully dehydrated by the benzene entraining method of Example A to an equivalent weight (based on free titratable acidity) of 130. Equimolar quantities of lactic acid and stearyl chloride were used. The reaction was carried out, as described in Example 1. The product had an equivalent weight of 350, indicating an average number of lactyl groups per molecule of 0.91.

EXAMPLE 3

Lactic acid was carefully dehydrated by the benzene entraining method of Example A to an equivalent weight (based on free titratable acidity) of 105. Equimolar quantities of lactic acid and stearyl chloride were used, the reaction conditions being identical to those in Example 1. The product had an equivalent weight of 325, indicating an average number of lactyl groups per molecule of 0.56.

EXAMPLE 4

The reaction was carried out as in Example 1, except palmityl chloride was used instead of stearyl chloride.

The resulting product had an equivalent weight of 312, indicating an average number of lactyl groups per molecule of 0.77.

EXAMPLE 5

Hydrogenated fish oil fatty acids having the following analysis:

| | Percent |
|---|---|
| Palmitic acid | 26.5 |
| Stearic acid | 17.5 |
| Arachidic acid | 26.0 |
| Behenic acid | 17.0 |
| Others | 13.0 | were treated with an equimolar quantity of thionyl chloride for two hours to prepare the mixed acyl chlorides, and the excess thionyl chloride was removed by warming the mixture at 90–100° C. for several hours.

The acyl chloride mixture is substituted in the process of Example 1. The average equivalent weight of the product based on free titratable acidity of 342 indicated an average number of lactyl groups per molecule of 0.75.

To prepare the salts of the acyl lactylic acids, the acids may be dissolved in a suitable solvent, such as absolute alcohol, and a small quantity of water, e.g., 1 to 10 percent by weight, together with salts of the desired cation, added. Typical salts include the carbonates, bicarbonates, hydroxides, and other salts of alkali and alkaline earth metals, aluminum and ammonium. Following admixture, the solvent is removed by vacuum desiccation to obtain the anhydrous salts.

Using this procedure, preferred salts having an average of less than 1 lactyl group per molecule have been prepared by using sodium bicarbonate, potassium carbonate, calcium carbonate, magnesium carbonate, aluminum chloride and ammonium hydroxide.

The fatty acid lactylic acids and salts thereof having an average number of lactyl groups per molecule of less than 1, and perferably between about 0.3 and 0.9, have surprising functionality as emulsifiers and modifiers of protein and starch materials when added as ingredients or in combination with ingredients of baked leavened goods.

The acid form of these materials, as has been brought out, is more stable than the acid form of materials in which the number of lactyl groups per molecule is greater than 1.

Thus, the free acid form of the materials of the present invention can be used in prepared cake mixes, or in shortening used to prepare cakes or other sweet leavened products. The resulting mixes and/or shortening compositions have extremely long shelf life, and the presence of the acyl lactylic acid in free acid form leads to marked improvement in the physical properties of the cake.

Shortenings or oils with which the acyl lactylic acids disclosed herein may be mixed are of the usual type, and are, in general, triglyceride oils or fats derived from animal sources such as lard or tallow and from plant sources such as the seed oils or corn, cotton, soy and the like. It is normal to improve their properties. The usual treatments include catalytic hydrogenation to improve the plasticity, increase hardness and reduce the iodine number of the fatty material and heat treatment in the presence of alkaline catalysts, with or without added glycerine, to improve the physical properties and functionality. For instance, the plastic superglycerinated vegetable shortenings have been hydrogenated and subjected to interesterification reactions to improve the physical characteristics and increase the emulsification properties of the shortening. Shortenings of the usual type may also contain glycerine and/or lecithin.

The acyl lactylic acids may be incorporated into the base oil by melting the shortening, or oil, and dissolving therein a small quantity of the acyl lactylic acid, and then carefully stirring and tempering the resultant mixture. Final treatment may also include the chilling and whipping treatments of the Votator process in the case of plastic shortenings.

The quantity of acyl lactylic acids imparting optimum functionality to the shortening compositions varies somewhat dependent upon the nature of the usual type shortening employed as the basic shortening material but has been found empirically to be within a rather narrow range of about 3% or less by weight. However, good results are also obtained with quantities ranging from about 0.5 to 5%. Obviously, however, combinations of the usual shortenings and larger amounts of the acyl lactylic acids can be produced and used in lieu of only a portion of the usual shortening with the same net functional benefits resulting, and such compositions are to be considered to be a part of this invention.

The functionality of the improved shortening compositions according to the invention in cake is superior to the usual type shortenings from which they are, in part, compounded. They provide for improved batter aeration and stability which results in cakes of notably improved volume, symmetry, and grain characteristics. The cakes obtained are desirably tender or "short" and have superior eating and keeping qualities. In addition the use of the improved compositions makes it much easier to prepare a satisfactorily balanced formula for a high ratio prepared dry cake mix.

The cake mixes according to the invention can be prepared, for example, by thoroughly blending together the usual mix ingredients, such as flour, baking powder and sugar, with the improved shortening composition; preferably the shortening composition is blended with the dry ingredients of such a mix before addition of liquid ingredients, such as water, milk, eggs, flavorings and the like.

Regardless of whether the acyl lactylic acid is added as a separate ingredient, or in combination with the shortening, the amount of acyl lactylic acid will generally range between about 0.1 and 5%, and preferably less than 3%, by weight, based upon the weight of shortening in the formula. However, certain speciality applications such as in the preparation of icings and fondants place greater demends on the fat-water emulsification and levels ranging from 5 to 10% based on the shortening weight have proven beneficial.

The surprising functionality of the acyl lactylic acids containing less than 1 lactyl acid group per mole, as compared to acyl polylactylic acids in which the number of lactyl groups per mole is greater than 1, is shown by the following examples:

EXAMPLE 6

Stearyl lactic acid preparations made according to the procedure of Example 1 and containing an average of 0.56, 0.77, and 0.91 lactyl groups per molecule, respectively, were admixed with a pure hydrogenated vegetable oil shortening and the resulting shortenings were compared in the following cake formulation:

| Ingredients | Bakers Percent | True percent (Dry Basis) |
|---|---|---|
| Cake flour | 100 | 35.20 |
| Salt | 3 | 1.05 |
| Baking powder | 6 | 2.11 |
| Granulated sugar | 120 | 42.23 |
| Powdered milk | 10 | 3.52 |
| Vanilla concentrate | 0.4 | 0.14 |
| Shortening | 36 | 12.67 |
| Egg whites (liquid) | 70 | 3.08 |
| Water | 90 | Abs. 53.23 |

52.7 percent of the total water is added to the dry mix over a one minute period at first speed using a Hobart N–50 mixer. The bowl is scraped down and mixed two minutes at first speed. The liquid egg whites are added over a one minute period at first speed, after which the bowl is scraped down again and the contents mixed two-and-one-half minutes at second speed. The remainder of the water (47.3%) is added over a one minute period at first speed, followed by scraping of the bowl and mixing three minutes at first speed.

The resulting batter, at a temperature of 72–78° F., is poured into 8″ layer cake pans, 368.5 grams to the pan, and baked for 24–26 minutes at 375° F.

The results of the comparative bake tests are tabulated in Table I. In the tables, A.I.B. method quality score refers to the American Institute of Baking system devised to measure the quality of baked leavened goods, and is a summary of the factors of symmetry, volume, crust, crumb color, grain, texture, flavor and aroma and eating quality. Also in the tables, comparative volumes were determined by rape seed displacement.

*Table I*

| Shortening | Batter, Sp. Gr. | Cake Volume (cc) | Quality Score |
|---|---|---|---|
| Control | 1.06 | 530 | 85 |
| 2.5% Stearyl 0.56 Lactylic Acid | 0.84 | 575 | 96 |
| 2.5% Stearyl 0.77 Lactylic Acid | 0.78 | 600 | 99 |
| 2.5% Steryl 0.91 Lactylic Acid | 0.81 | 585 | 98 |

It is obvious from the above table that the average number of lactyl groups per molecule is an important factor in the degree of functionality of the acyl lactic acids and that the functionality approaches optimum between 0.77 and 0.91 lactyl groups per molecule on the average.

The following example demonstrates the improved storage stability of acyl lactylic acids containing minimal amounts of polymeric lactic acid combined with prepared mix ingredients.

EXAMPLE 7

Dry mixes containing the acyl lactylic acids cited in Table II are stored over a period of six months. After two, four, and six months, cake is prepared from the dry mixtures using the procedure of Example 6. The level of acyl lactylic acid in the shortening is held constant at 3% of the shortening weight. The results of these tests are summarized in Table II. In the tests, the stearyl 0.77 lactylic acid and stearyl 0.56 lactylic acid were prepared using the procedure of Examples 1 and 3 respectively.

*Table II*

| Emulsifier | Stearyl 1.2 Lactylic Acid | Stearyl 0.77 Lactylic Acid | Stearyl 0.56 Lactylic Acid |
|---|---|---|---|
| Initial-Volume | 1,020 | 1,100 | 1,150 |
| A.I.B. Quality Score | 95 | 98 | 97 |
| 2 Month—Volume | 910 | 1,050 | 1,100 |
| A.I.B. Quality Score | 91 | 96 | 98 |
| 4 Month—Volume | 930 | 1,150 | 1,200 |
| A.I.B. Quality Score | 86 | 98 | 95 |
| 6 Month—Volume | 870 | 1,200 | 1,125 |
| A.I.B. Quality Score | 79 | 92 | 90 |

As can readily be seen from Table II, when the average number of lactyl groups per molecule is less than 1, the cake mixes had greatly improved storage stability, as compared with the cake mixes containing acyl polylactylic acids having more than one lactyl group per molecule.

To further demonstrate the marked improvement of acyl lactylic acids containing less than one lactyl group per molecule, the following experiment is presented. To be stable in storage when used as an ingredient in chemically leavened cake premixes containing baking soda, the acyl lactylic acid composition must not contain strong water soluble acids such as lactic acid, and must not yield acidic components on contact with moisture. Thus the following test is indicative of storage stability.

One gram of the product is weighed into a 100 ml. beaker, 50 ml. of distilled water added, and the mixture stirred rapidly five minutes at 90° C. The mixture is then cooled to room temperature, filtered, and the pH of the water determined. Since their preparation, the pH values are indicative of the stability of the type of composition used.

|  | pH |
|---|---|
| Stearyl 0.56 lactylic acid | 3.4 |
| Stearyl 0.77 lactylic acid | 3.3 |
| Stearyl 0.91 lactylic acid | 3.1 |
| Stearyl 1.20 lactylic acid | 2.8 |

Thus stability in storage increases as the number of lactyl groups per molecule decreases.

The difference between stearyl lactylic acid compositions with an average number of lactyl groups of less than one and those with an average of more than one is clearly illustrated in the following two compounds which have been analyzed chromatographically.

| Lactyl groups/molecule | 1.20 | 0.81 | Component |
|---|---|---|---|
| Fraction I | 24.97 | 21.47 | Stearic Acid. |
| Fraction II | 38.57 | 68.27 | Stearyl Monolactic Acid. |
| Fraction III | 19.97 | 8.07 | Stearyl Dilactic Acid. |
| Fraction IV | 7.97 | 0.67 | Stearyl Polylactic Acid. |
| Fraction V | 8.47 | 1.87 | Polylactic Acid. |

It is readily seen that the two composition mixtures are distinctly different, one containing insignficant amounts of polylactic material (Fractions IV and V), the other a very high percent of the same.

In addition to use in cake mixes and shortening, the materials of the present invention both in free acid and salt form, have been found to have a marked effect on the gelation temperature of starch and the mixing character of bread flour, particularly when the materials are used in salt form. This effect is greatly accentuated when the average number of lactyl groups per molecule is less than one.

In using the materials disclosed herein and containing less than one lactyl group per molecule in yeast leavened baked goods, the materials may be admixed with the flour, or may be added separately to the mixture used to produce the baked products. Alternatively, the material can be mixed with other ingredients and in this way incorporated into the formula. In any event, the acyl lactylic acid compositions disclosed herein lead to physical improvement of the properties of the flour, regardless of whether they are added in intimate admixture with the flour itself, or added to the baked leavened dough product as separate ingredients, or in admixture with other ingredients.

Preferably, the acyl lactylic acid compositions containing less than one lactyl group per molecule are admixed with the flour to provide new and useful flour compositions for use in baked leavened goods.

Regardless of how added, the amount of the acyl lactylic acid compositions may vary up to about 5% by weight of the flour, although usually between about 0.1 and 1% by weight of the flour will be sufficient.

When added to the flour, mixtures of flour and the acyl lactylic acid compositions containing from about 1 to 99 percent by weight acyl lactylic acid compositions may be prepared. Such a mixture may then be used as a substitute for flour or in lieu of a portion of the flour, as will readily be understood.

The mixing characteristics of a flour and the quality of the baked products obtained therefrom, are determined to a very large extent by the colloidal properties of the proteinaceous component. An instrument called the Farinograph is conventionally employed in the art to determine the characteristics of the flour, and the data obtained from this instrument have been demonstrated to correlate with the conditions which must prevail in a bakery if products of optimum quality are to be obtained. This procedure is now well established for yeast leavened products. Although the data obtained have also been used to predict the performance of flour in batters, the exactitude of correlation is not so well established as with yeast leavened products. The operation of the Farinograph is well understood in the art and is described, for example, in United States Patent 2,744,826.

The Farinograph is essentially a miniature, low speed, recording mixer and provides three measurements on a flour which are of value in establishing the characteristics of the flour, predicting its baking performance and permitting procedural alterations to allow for the variables. By placing a specified amount of flour in the bowl and titrating, the amount of water required to give a paste of standard consistency is determined. This titration figure, called absorption, will vary from 50 to 65 percent for normal flours. A time value, called mixing time or peak time, is indicated by the time required to develop the gluten colloid in the paste and to reach a standard maximum viscosity with mixing. The measure, called mixing tolerance index or MTI, is the change in paste viscosity in the units of measure caused by breakdown or dispersion of the gluten colloid five minutes after the maximum or peak viscosity is reached. The MTI is a reciprocal function of tolerance to mixing and handling; tolerance increases as MTI decreases.

The Farinograph data are of value to the baker in establishing mixing time and absorption optimums for a flour used in making yeast leavened products, but the action of the high speed commercial mixers is such that actual attainment of an optimum mix is very difficult and some tolerance in this respect is very important. In baking practice the flour used in this kind of product is a strong flour, with high gluten content, usually somewhat more than 10%. Flours with a low MTI are desirable; one with an MTI of 40–50 will lead to production difficulties because it lacks tolerances. Flours with an MTI over 50 will be rejected by many bakers.

Confectioners flours of the types used in cakes, cookies, pie doughs, doughnuts, and the like, usually are of finer granulation and more highly bleached. They are made from soft wheats of widely varying types but, in general, have a protein content of about 8% which is of a weak or very extensible type. If the protein is too high, the baker expects a batter product, such as cakes, to be of tough consistency, although the flour might make fine cookies. Taking into account the protein content required to give a particular batter product, the more extensible the gluten, the better the product. The tolerance measurement provided by the Farinograph is correlated with extensibility, which will determine the cellular crumb structure and eating quality of the finished product.

EXAMPLE 8

To demonstrate the action of acyl lactylates in the modification of the mixing properties of wheat flour, acyl lactylates having varying $n$ values are compared directly. The Barbender Farinograph with large bowl is used in the preparation of mixing curves. Farinograms are prepared using 300 g. of flour on a 14% moisture basis.

The acyl lactylic acids tested were combined with the flour in the form of a 50% by weight hydrate. The water employed in preparing the aqueous form was taken into consideration in reporting the absorption.

After the normal absorption required to give a peak viscosity of 500 B.U. is determined by titration, this quantity of water is kept constant for the remainder of the mixing test. The two criteria, mixing time and mixing tolerance index, are obtained by interpretation of the curves.

The results obtained using this method are summarized in Table III.

*Table III*

| Composition | Minutes Peak Time | M.T.I., 5 Min. | M.T.I., 10 Min. |
|---|---|---|---|
| Control Flour | 5.25 | 60 | |
| 0.25% Stearyl 0.69 Lactylic Acid | 5.25 | 35 | |
| 0.50% Stearyl 0.69 Lactylic Acid | 4.0 | 15 | |
| 1.00% Stearyl 0.69 Lactylic Acid | 3.50 | 20 | 20 |
| 0.25% Stearyl 1.15 Lactylic Acid | 5.5 | 45 | |
| 0.50% Stearyl 1.15 Lactylic Acid | 4.5 | 20 | |
| 1.00% Stearyl 1.15 Lactylic Acid | 4.0 | 20 | 30 |

This data shows that the stearyl 0.69 lactylic acid at the levels used has a pronounced ability to increase mixing tolerance. The improvement is significantly greater than that found when the acid form of stearyl 1.15 lactylate was tested. The changes found in mixing, or peak time, confirm the improved effect of the acyl lactylate in which the average number of lactyl groups per molecule is less than one.

As indicated above, flour with low MTI is known to be the most desirable. The significance of the variations of apparent mixing time are not definitely understood, however smaller values have been found to correlate with greater functionality of an acyl lactylic acid preparation due to greater retardation of the rate of hydration of starch, a known effect of acyl lactylate compounds.

The materials disclosed herein, both in free acid form as well as in salt form, not only improve the overall quality of bread and other baked leavened products, but also substantially improve the retention of the soft character of the baked leavened products during aging and therefore retard the apparent staling of such products. So far as staling is concerned, the effect of the materials having an average number of lactyl groups per mole of less than one show much greater anti-staling effects than do the acyl polylactylic acid compositions having an average of more than one lactyl group per molecule. The comparison is about in the same relationship as that indicated in Example 8.

The particular ingredients employed in making the baked leavened products described hereinabove form no part of the present invention since any suitable formulae for the baked goods may be used. The basic ingredients used in the manufacture of bread, for example, are flour, water, sodium chloride and yeast. For commercial bread, sugar, milk, shortening and a suitable emulsifier for the shortening, such as glycerides, are conventionally added to these basic ingredients, and the present invention is particularly suitable with bread formulae containing such additional ingredients. For cake, or other sweet leavened products, eggs as well as other enriching agents may also be added. Ordinarily, in making cake, chemical leavening agents, such as baking powder, rather than yeast, are employed.

The invention in its broader aspects is not limited to the specific compositions, steps and methods described, but departures may be made therefrom within the scope of the accompanying claims without departing from the principles of the invention and without sacrificing its chief advantages.

What is claimed is:

1. A composition of matter comprising flour in intimate admixture with an acyl lactylic acid composition corresponding to the formula:

$$RCO(OCHCH_3CO)_nOZ$$

wherein RCO is a member selected from the group consisting of acyl radicals of fatty acids containing 16 to 24 carbon atoms and mixtures thereof, $n$ is a number ranging from about 0.3 to about 0.9 which represents the average number of lactyl groups present per molecule and Z is a cation selected from the group consisting of sodium, potassium, calcium, magnesium, ammonium, aluminum, and hydrogen.

2. A cake mix comprising flour, baking powder, sugar, shortening, and 0.1 to 5% by weight, based on the weight of shortening, of an acyl lactylic acid composition corresponding to the formula:

$$RCO(OCHCH_3CO)_nOZ$$

wherein RCO is a member selected from the group consisting of acyl radicals of fatty acids containing 16 to 24 carbon atoms and mixtures thereof, $n$ is a number ranging from about 0.3 to about 0.9 which corresponds to the average number of lactyl groups present per molecule and Z is a cation selected from the group consisting of sodium, potassium, calcium, magnesium, ammonium, aluminum, and hydrogen.

3. A composition of matter comprising shortening and an acyl lactylic acid composition of the formula:

$$RCO(OCHCH_3CO)_nOZ$$

wherein RCO is a member selected from the group consisting of acyl radicals of fatty acids containing 16 to 24 carbon atoms, and mixtures thereof, $n$ is a number ranging from about 0.3 to about 0.9 which represents the average number of lactyl groups per molecule and Z is a cation selected from the group consisting of sodium, potassium, calcium, magnesium, ammonium, aluminum, and hydrogen.

References Cited in the file of this patent

UNITED STATES PATENTS

| | | |
|---|---|---|
| 2,744,825 | Thompson et al. | May 8, 1956 |
| 2,744,826 | Thompson et al. | May 8, 1956 |
| 2,943,270 | Thompson et al. | Feb. 28, 1961 |